United States Patent
Baughman et al.

(10) Patent No.: US 10,713,574 B2
(45) Date of Patent: Jul. 14, 2020

(54) COGNITIVE DISTRIBUTED NETWORK

(71) Applicant: INTERNATIONAL BUSINESS MACHINES CORPORATION, Armonk, NY (US)

(72) Inventors: Aaron K. Baughman, Silver Spring, MD (US); Thomas B. Harrison, Holly Springs, NC (US); Brian M. O'Connell, Cary, NC (US); Herbert D. Pearthree, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 978 days.

(21) Appl. No.: 14/249,679

(22) Filed: Apr. 10, 2014

(65) Prior Publication Data
US 2015/0294216 A1    Oct. 15, 2015

(51) Int. Cl.
| | |
|---|---|
| G06N 5/04 | (2006.01) |
| G06F 16/332 | (2019.01) |
| G06F 40/279 | (2020.01) |
| G06N 20/00 | (2019.01) |
| G06N 3/12 | (2006.01) |

(52) U.S. Cl.
CPC .......... *G06N 5/04* (2013.01); *G06F 16/3329* (2019.01); *G06F 40/279* (2020.01); *G06N 20/00* (2019.01); *G06N 3/126* (2013.01)

(58) Field of Classification Search
None
See application file for complete search history.

(56) References Cited

U.S. PATENT DOCUMENTS

| | | |
|---|---|---|
| 6,782,499 B2 | 8/2004 | Osada et al. |
| 7,093,143 B2 | 8/2006 | Ito et al. |
| 7,141,883 B2 | 11/2006 | Wei et al. |
| 7,161,828 B2 | 1/2007 | Cummings et al. |

(Continued)

FOREIGN PATENT DOCUMENTS

| | | |
|---|---|---|
| CA | 2401057 | 9/2001 |
| CN | 102135914 | 7/2011 |

(Continued)

OTHER PUBLICATIONS

Ferrucci, D. et al., "Building Watson: An overiew of the DeepQA project." AI Magazine, vol. 31, No. 3 (2010). pp. 59-79.*

(Continued)

*Primary Examiner* — Kakali Chaki
*Assistant Examiner* — Brian M Smith
(74) *Attorney, Agent, or Firm* — William H. Hartwell; Andrew M. Calderon; Roberts Calderon Safran & Cole, P.C.

(57) ABSTRACT

Approaches are provided for answering an inquiry of a cognitive distributed network. An approach includes receiving the inquiry at the cognitive distributed network. The approach further includes determining a classification for the inquiry based on natural language of the inquiry. The approach further includes classifying the inquiry as a single question class. The approach further includes determining, by at least one computing device, a type of introspection to be used by the cognitive distributed network on the inquiry. The approach further includes generating an answer to the inquiry based on the determined type of introspection.

20 Claims, 11 Drawing Sheets

(56) References Cited

U.S. PATENT DOCUMENTS

| | | |
|---|---|---|
| 7,254,797 B2 | 8/2007 | Garlepp |
| 8,571,467 B2 | 10/2013 | Uusitalo et al. |
| 8,578,028 B2 | 11/2013 | Grigsby et al. |
| 8,612,599 B2 | 12/2013 | Tung et al. |
| 8,621,080 B2 | 12/2013 | Iyoob et al. |
| 2004/0049478 A1* | 3/2004 | Jasper .................. G06F 16/35 |
| 2009/0043749 A1* | 2/2009 | Garg ................ G06F 16/3338 |
| 2009/0265707 A1 | 10/2009 | Goodman et al. |
| 2010/0179811 A1* | 7/2010 | Gupta .................. G10L 15/22 704/235 |
| 2011/0112441 A1 | 5/2011 | Burdea |
| 2012/0005148 A1 | 1/2012 | Horvitz et al. |
| 2012/0173243 A1* | 7/2012 | Anand .............. H04M 3/4936 704/270.1 |
| 2012/0311657 A1 | 12/2012 | Boldyrev et al. |
| 2012/0329384 A1 | 12/2012 | Boldyrev et al. |
| 2013/0007259 A1* | 1/2013 | Pacheco-Sanchez ........................ G06F 11/3447 709/224 |
| 2013/0055258 A1* | 2/2013 | De ............................ G06F 8/63 718/1 |
| 2013/0073490 A1 | 3/2013 | Baughman et al. |
| 2013/0086431 A1 | 4/2013 | Arndt et al. |
| 2013/0139152 A1* | 5/2013 | Chang ................ G06F 9/45545 718/1 |
| 2013/0173597 A1* | 7/2013 | Do ....................... G06F 9/5011 707/722 |
| 2013/0219067 A1 | 8/2013 | Boss et al. |
| 2013/0254374 A1 | 9/2013 | Bogdany et al. |
| 2013/0263019 A1 | 10/2013 | Castellanos et al. |
| 2013/0273959 A1 | 10/2013 | Wu et al. |
| 2013/0275961 A1 | 10/2013 | Anderson et al. |
| 2013/0290542 A1 | 10/2013 | Watt et al. |
| 2013/0290598 A1 | 10/2013 | Fiske et al. |
| 2014/0006377 A1 | 1/2014 | Astore |
| 2014/0040883 A1 | 2/2014 | Tompkins |
| 2014/0047272 A1 | 2/2014 | Breternitz et al. |
| 2014/0053226 A1 | 2/2014 | Fadida et al. |
| 2014/0055458 A1 | 2/2014 | Bogdany et al. |
| 2014/0059226 A1 | 2/2014 | Messerli et al. |
| 2014/0079297 A1 | 3/2014 | Tadayon et al. |
| 2014/0165063 A1 | 6/2014 | Shiva |
| 2015/0149932 A1* | 5/2015 | Yamada ................ G06Q 30/02 715/753 |

FOREIGN PATENT DOCUMENTS

| | | |
|---|---|---|
| CN | 102385719 | 3/2012 |
| CN | 103036974 | 4/2013 |
| CN | 103095533 | 5/2013 |
| CN | 103220365 | 7/2013 |
| CN | 103577268 | 2/2014 |
| WO | 2001080158 | 10/2001 |
| WO | WO 2012087104 A1 * | 6/2012 ........... G06F 9/5083 |
| WO | 201310262 | 1/2013 |
| WO | 201339555 | 3/2013 |

OTHER PUBLICATIONS

Quarteroni, S. et al., "Designing an interactive open-domain question answering system." Natural Language Engineering, vol. 15, No. 01 (2009). pp. 73-95.*

Vishwanath, K. V., et al., "Characterizing cloud computing hardware reliability." Proc. of the 1st ACM Symposium on Cloud Computing (Jun. 2010). pp. 193-204.*

Valenzuela, O. et al., "Hybridization of intelligent techniques and ARIMA models for time series prediction." Fuzzy Sets and Systems, vol. 159, No. 7 (2008). pp. 821-825.*

Varges, S. et al., "Interactive question answering and contraint relaxation in spoken dialogue systems." Proc. of the 7th SIGdial Workshop on Discourse and Dialogue, Assoc. for Computational Linguistics (2009). 8 pp.*

Craig, J. "Cloud, Big Data, Analytics, and Diagnostics Chart the Future of Application Performance Management (APM)." White paper published by Enterprise Management Associates, Inc (Sep. 27, 2013). 9 pp.*

Tan, Y. et al., "PREPARE: Predictive performance anomaly prevention for virtualized cloud systems." IEEE 32nd Intl. COnf. on Distributed COmputing Systems (ICDCS) (2012). pp. 285-294.*

Gondek, D.C. et al., "A framework for merging and ranking of answers in DeepQA," IBM J. of Research and Development, vol. 56, No. 3/4 (May/Jul. 2012) pp. 1-12. (Year: 2012).*

Campegiani, P. et al., "A genetic algorithm to solve the virtual machines resources allocation problem in a multi-tier distributed systems," 2nd Annual Intl. Workshop on Virtualization Performance: Analysis, Characterization, and Tools (VPACT 2009) 9 pp. (Year: 2009).*

Chen et al., "Parameter Selection for Sub-hyper-sphere Support Vector Machine", Department of Computer Science & Technology, Third International Conference on Natural Computation (ICNC 2007), 4 pages.

Lin-cheng Zhou et al.,"QPSO-Based Hyper-Parameters Selection for LS-SVM Regression", Fourth International Conference on Natural Computation, 2008 IEEE, 4 pages.

Jeong et al., "Adaptive response mechanism based on the hybrid simulation and optimization for the real time event management", 2009 International Conference on New Trends in Information and Service Science, 6 pages.

Deusen et al.,"The Elements of Nature:Interactive and Realistic Techniques", University of Constance, Germany, Article 32, Jan. 2004. 406 pages.

Abraham et al.,"Survey of Spatio-Temporal Databases", Advanced Computing Research Centre, School of Computer and Information Science, University of South Australia,1999 Kluwer Academic Publishers, Boston, 39 pages.

Ullah et al., "Fuzzy Monte Carlo Simulation using point-cloud-based probability-possibility transformation", The Society for Modeling and Simulation International (SCS), vol. 89 Jul. 2013, 17 pages.

Babu et al.,Recovery and visualization of 3D structure of chromosomes from tomographic reconstruction images, EURASIP Journal of Applied Signal Processing, vol. 2006, Article ID 45684, 13 pages.

Zhou et a.,"Data-Parallel Octrees for Surface Reconstruction", IEEE Transactions on Visualization and Computer Graphics, vol. 17, No. 5, May 2011, 13 pages.

Ruthven et al., "Constructions of dynamic geometry: A study of the interpretative flexibility of educational software in classroom practice", Computers & Education 51, 2008, 21 pages.

Raad et al.,"Achieving Sub-Second Downtimes in Internet-wide Virtual Machine Live Migrations in LISP Networks", IFIP/IEEE International Symposium on Integrated Network Management (IM2013), 8 Pages.

Chen et al.,"Fitting a Surface to 3-D Points Using an Inflating Balloon Model", Institute for Robotics and Intelligent Systems, University of Southern California,1994 IEEE, 8 pages.

Office Action dated Dec. 4, 2015 in related U.S. Appl. No. 14/247,594, 8 pages.

Erik Blasch et al., "Information Fusion in a Cloud-Enabled Environment" "Approved for Public Realease; Distribution Unlimited: 88ABW-2013-1114, Mar. 8, 2013", 25 pages.

Bontcheva et al.,"GATECloud.net: a platform for large-sclae,open-source text processing on the cloud" Phil. Trans.R Soc. A 2013371,20120071, Dec. 10, 2012, 14 pages.

Cai et al.,"A Cognitive Platform for Mobile Cloud Gaming", Cloud computing Technology and Science(CloudCom), 2013 IEEE 5th International Conference vol. 1, Publication Year 2013, pp. 72-79.

Georgakopoulos et al., "Cognitive cloud-oriented wireless networks for the Future Internet".,Wireless Communications and Networking Conference Workshops (WCNCW), 2012 IEEE. pp. 431-435.

Jivanadham, L.B. et al.,"Cloud Cognitive Authenticator (CCA): A public cloud computing authentication mechanism", Informatics, Electronics & Vision (ICIEV), 2013 International Conference on May 17-18, 2013, pp. 1-6.

(56) References Cited

OTHER PUBLICATIONS

Wang et al., "Optimizing the cloud platform performance for supporting large-scale cognitive radio networks", Wireless Communications and Networking Conference (WCNC), 2012 IEEE Apr. 1-4, 2012, 3255-3260 pages.

Chun-Hsien et al.,"Cooperative spectrum sensing in TV White Spaces: When Cognitive Radio meets Cloud", Computer Communications Workshops (INFOCOM WKSHPS), 2011 IEEE Conference on Apr. 10-15, 2011, 672-677 pages.

Park et al.,"Cognitive cryptography plugged compression for SSL/TLS-based cloud computing services" Journal ACM Transactions on Internet Technology (TOIT), vol. 11 Issue 2, Dec. 2011.

Lewis et al.,"Opportunities in cloud computing for people with cognitive disabilities: designer and user perspective", UAHCI'11 Proceedings of the 6th international conference on Universal access in human-computer interaction: users diversity—vol. Part II pp. 326-331.

Höyhtyä et al.,"Cognitive engine: design aspects for mobile clouds", CogART '11 Proceedings of the 4th International Conference on Cognitive Radio and Advanced Spectrum Management Article No. 32.

Jun Zhu et al., "Twinkle: A Fast Resource Provisioning Mechanism for Internet Services", IEEE INFOCOM, 2011, pp. 802-810.

Sivadon Chaisiri et al., "Optimization of Resource Provisioning Cost in Cloud Computing", IEEE Transactions on Services Computing, Apr.-Jun. 2012, vol. 5, No. 2, pp. 164-177.

Beloglazov et al., "Adaptive Threshold-Based Approach for Energy Efficient Consolidation of Virtual Machines in Cloud Data Centers", Proceedings of the 8th International Workshop on Middleware for Grids, Clouds and e-Science, Nov. 29-Dec. 3, 2010; 6 Pages.

Jain et al., "A Threshold Band Based Model for Automatic Load Balancing in Cloud Environment", Cloud Computing in Emerging Markets (CCEM), 2013, pp. 1-7.

Rak et al., "Cloud-based Concurrent Simulation at Work: Fast Performance Prediction of Parallel Programs", IEEE 21st International WETICE, 2012, pp. 137-142.

Janiesch et al., "Business Activity Management for Service Networks in Cloud Environments", M W4SOC, Dec. 12, 2011; 6 Pages.

Antonescu et al., "Dynamic SLA Management with Forecasting Using Multi-Objective Optimization", Communication and Distributed Systems (CDS) Research Group, 7 Pages.

Davidson, "Beyond Fun: Serious Games and Media", ETC Press, 2008; 199 Pages.

Bonebakker, "Finding Representative Workloads for Computer System Design", 2007; 292 Pages.

Owayedh, M.S., et al., "Identification of Temperature and Social Events Effects on Weekly Demand Behavior", IEEE, 2000, pp. 2397-2402.

Weinman, J., "Time is money: the value of on-demand", JoeWeinman.com, Jan. 7, 2011, 30 pages.

Weng. Y., et al., "Price spike forecasting using concept-tree approach based on cloud model", IEEE, 2009, Abstract.

Tirado, J.M., et al., "Predictive Data Grouping and Placement for Cloud-Based Elastic Server Infrastructures", IEEE, 2011, Abstract.

Paris, J.F., et al., "Delayed Chaining: A Practical P2P Solution for Video-on-Demand", IEEE, 2012, Abstract.

Jiu, R., et al., "A predictive judgment method for WLAN attacking based on cloud computing environment", IEEE, 2010, Abstract.

Lagar-Cavilla, HA, et al., "SnowFlock: Virtual Machine Cloning as a First-Class Cloud Primitive", ACM Transactions on Computer Systems (TOCS) Journal, 2011, 51 pages.

Terzis, A .. et al., "Wireless Sensor Networks for Soil Science", International Journal of Sensor Networks, vol. 7, Issue 1/2, Feb. 2010, 18 pages.

\* cited by examiner

COGNITIVE DISTRIBUTED NETWORK

TECHNICAL FIELD

The present invention generally relates to cognitive computing, and more particularly, to a cognitive distributed network that interacts with humans naturally for exploring application data across a system.

BACKGROUND

Cognitive computing is a term that has a broad scope and meaning within the context of computer science. Generally cognitive computing refers to the development of computer systems modeled after the human brain. Originally referred to as artificial intelligence (AI), researchers began to use cognitive computing to indicate that the science was designed to teach computers to think like a human mind, rather than developing an artificial system. This type of computing integrates technology and biology in an attempt to re-engineer the brain, one of the most efficient and effective computers on Earth.

Cognitive computing has its roots in the middle of the twentieth century, when computer companies first began to develop intelligent computer systems. Most of these systems were limited, however, because they could not learn from their experiences. Early artificial intelligence could be taught a set of parameters, but was not capable of making decisions for itself or intelligently analyzing a situation and coming up with a solution. In order to overcome such challenges, prominent figures such as Alan Turing proposed computing challenges in which a human and computer were indistinguishable at games such as chess and question and answer tasks. These challenges became known as the Turing Test, which is a test of a machine's ability to exhibit intelligent behavior equivalent to, or indistinguishable from, that of a human. In an illustrative example, a human judge engages in natural language conversations with a human and a machine designed to generate performance indistinguishable from that of a human being. All participants are separated from one another. If the judge cannot reliably tell the machine from the human, the machine is said to have passed the Turing Test. The Turing Test does not check the ability to give the correct answer to questions. Instead, the Turing Test checks how closely the answer resembles typical human answers. The conversation is limited to a text-only channel such as a computer keyboard and screen so that the result is not dependent on the machine's ability to render words into audio. The Turing Test has become an important concept in the philosophy of AI.

SUMMARY

In a first aspect of the invention, a method for answering an inquiry of a cognitive distributed network includes receiving an inquiry at the cognitive distributed network. The method further includes determining a classification for the inquiry based on natural language of the inquiry. The method further includes classifying the inquiry as a single question class. The method further includes determining, by at least one computing device, a type of introspection to be used by the cognitive distributed network on the inquiry. The method further includes generating an answer to the inquiry based on the determined type of introspection.

In another aspect of the present invention, a method for deploying a system for answering an inquiry of a networked computing environment includes providing a computer infrastructure being operable to: receive an inquiry, determine a classification for the inquiry based on natural language of the inquiry, classify the inquiry as a single question class, determining a type of introspection to be used on the inquiry, and generate an answer to the inquiry based on the determined type of introspection.

In another aspect of the invention, there is a computer program product for answering an inquiry of a cognitive distributed network. The computer program product includes a computer readable storage medium having program instructions embodied in the storage medium. The program instructions are readable/executable by a computing device to cause the computing device to receive the inquiry. The computer program product includes determining, by the computing device, a classification for the inquiry. The computer program product includes classifying, by the computing device, the inquiry as a conversational class. The computer program product includes determining, by the computing device, whether the inquiry pertains to past performance or future performance of the cognitive distributed network. The computer program product includes in response to determining the inquiry pertains to the past performance, applying, by the computing device, natural language processing to the inquiry to determine how the cognitive distributed network was performing in the past. The computer program product includes in response to determining the inquiry pertains to the future performance, applying, by the computing device, the natural language processing to the inquiry to determine how the cognitive distributed network will be performing in the future. The computer program product includes using, by the computing device, a recall oriented introspection algorithm to minimize false negative responses. The computer program product includes replying, by the computing device, to the inquiry based on the determination of how the cognitive distributed network was performing in the past or will be performing in the future, and the use of the recall oriented introspection algorithm.

In a further aspect of the invention, there is a computer system for answering an inquiry of a cognitive distributed network. The system includes a CPU, a computer readable memory and a computer readable storage medium. Additionally, the system includes one or more program instructions. The program instructions are operable to receive the inquiry. The program instructions are further operable to determine a classification for the inquiry. The program instructions are further operable to receive the inquiry. The program instructions are further operable to determine a classification for the inquiry. The program instructions are further operable to classify the inquiry as a conversational class. The program instructions are further operable to determine whether the inquiry pertains to past performance or future performance of the cognitive distributed network. In response to determining the inquiry pertains to the past performance, the program instructions are further operable to apply natural language processing to the inquiry to determine how the cognitive distributed network was performing in the past. In response to determining the inquiry pertains to the future performance, the program instructions are further operable to apply natural language processing to the inquiry to determine how the cognitive distributed network will be performing in the future. The program instructions are further operable to use a recall oriented introspection algorithm to minimize false negative responses. The program instructions are further operable to reply to the inquiry based on the determination of how the cognitive distributed network was performing in the past or will be performing in the future, and the use of the recall oriented introspection algorithm. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
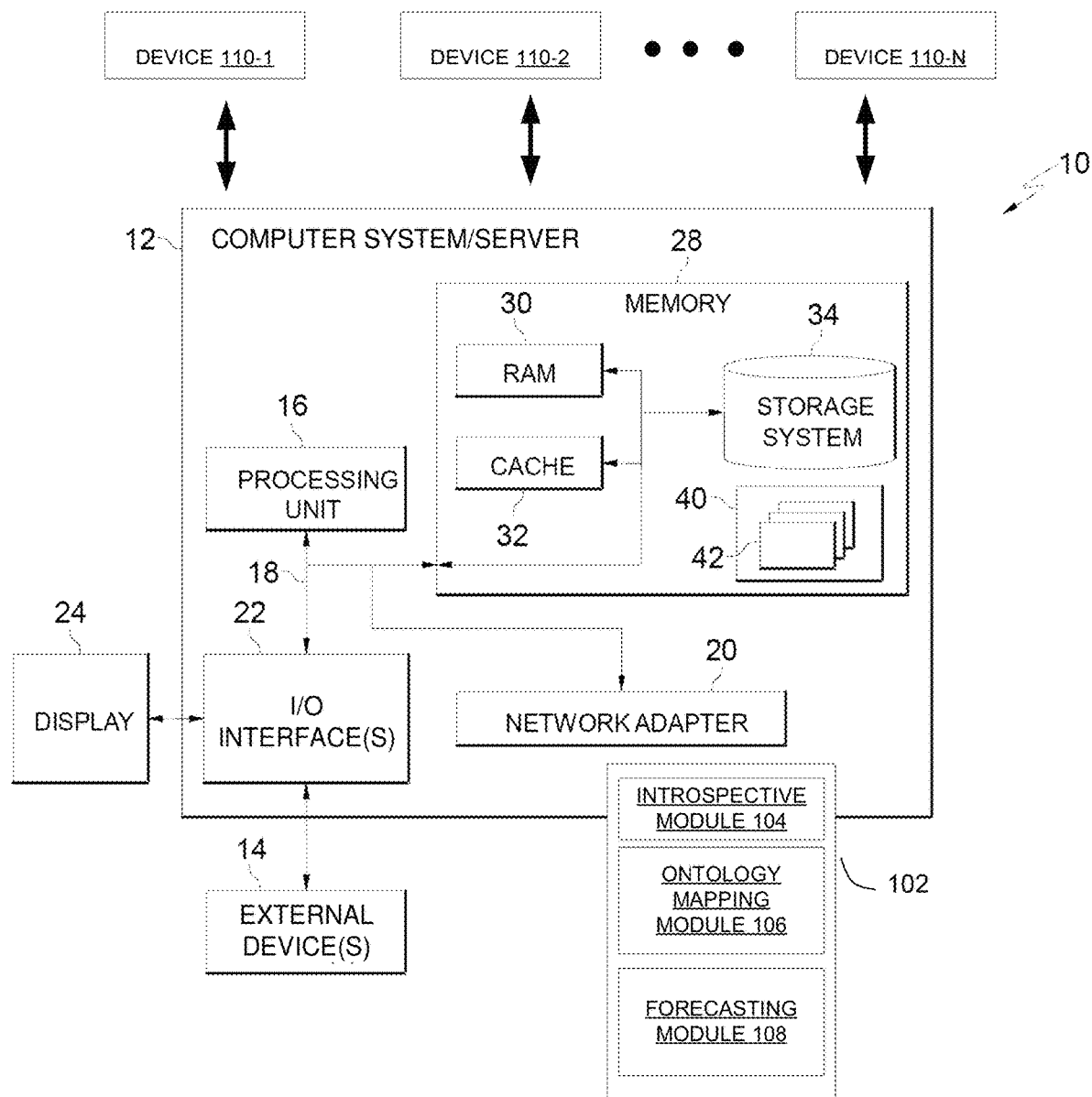
FIG. 1 is an example environment for implementing the steps in accordance with aspects of the present invention.

The present invention generally relates to cognitive computing, and more particularly, to a cognitive distributed network that interacts with humans naturally for exploring application data across a system. In embodiments, the present invention allows for humans to ask a cognitive distributed network, such as a cloud (hereafter known as "cognitive cloud", "cloud", or "cloud computing node"), a question or for humans to have a conversation with a cognitive cloud to discover a health (e.g., functionality or performance) of the cognitive cloud. In embodiments, through natural language questions and answers or conversational interactions (e.g., inquiry), humans may gain a deeper insight about a cloud. Additionally, as a cloud gains data, reinforcement metrics, and cognitive computing algorithms, the cloud learns how to operate within the demands of its shared services. Accordingly, the present invention can: (i) provide for an enhanced human cognitive ability by allowing for humans to better understand a nebulous computing service; (ii) provide for machine learning by way of genetic algorithms, clustering, and decision trees, which yield patterns from data such that the cloud may be taught; and (iii) provide for a natural language interface that allows humans to teach and learn from the cloud.

Two of the founders of artificial intelligence, Herbert Simon and Allen Newell, proposed that a digital computer would someday defeat a human in a chess match. Their prediction was correct, and a computing machine named Deep Blue defeated the world's best chess player, Gary Kasparov, in a chess match. The first of Turing's grand challenges was solved, a closed system chess problem. However, the much broader domain, question and answer tasks required a system to understand any natural language question and to respond with an equivalent answer that was accurate. In 1994, International Business Machines (IBM®) embarked on a radical grand challenge to progress the evolution of thinking machines. Over years of research and development, a system called Deep Question and Answer and later named IBM Watson™ (Watson) competed on Jeopardy!®. On Feb. 14-16, 2011, Watson defeated both Brad Rutter, the largest money winner on Jeopardy! and Ken Jennings, the record holder for the longest winning streak. Watson was not connected to the Internet for the match. It only knew what it had amassed through years of persistent interaction and learning from a large set of unstructured knowledge. Using machine learning, statistical analysis and natural language processing to find and understand the clues in the questions, Watson then compared possible answers, by ranking its confidence in their accuracy, and responded all in about three seconds. (IBM, IBM Watson, and Watson are trademarks of International Business Machines Corporation registered and unregistered in many jurisdictions worldwide).

Critics of the Turing Test claim that the tests are much too restrictive and would produce an "artificial con artist", whereby Watson could only pass an Imitation Test on Jeopardy!. However, in the massively parallel probabilistic question and answer system, Watson, is going through a process of domain adaptation to become a teacher, student, and advisor for real world problems. Watson popularized many AI computing technologies and became more than a computing a system as indicated by Time® Magazine's "100 most influential" issue and the top 10 Man-vs.-Machine moments. Consequently, technologies such as data visualization, machine learning, natural language processing (NLP), predictive analytics, cloud, forecasting, human computer interaction, and distributed computing are coming together to form the basis of a new era of computing known as cognitive computing, which is based on the following three principles: interact naturally with humans, technology learns with use, and enhance humane cognitive ability.

Cognitive computing systems learn and interact naturally with people to extend what either humans or machine could do on their own. They help human experts make better decisions by penetrating the complexity of vast amounts of data. Cognitive computing systems get better over time as they build knowledge and learn a domain (e.g., a cognitive computing system's language and terminology), its processes and its preferred methods of interacting. Unlike expert computing systems of the past, which required rules to be hard coded into a system by a human expert, cognitive computing systems can process natural language and unstructured data and learn by experience, much in the same way humans do.

In cloud computing, large clusters of computing resources are assembled together to provide support for processing intensive loads, diverse user bases, and heterogeneous environments. Typically cloud computing provides shared resources, software, and information to computing devices through the Internet. For example, the IBM Events Infrastructure Team supports highly visible professional sports tournaments. While the duration of each tournament varies from three weeks in tennis to a week in golf, the amount of website requests ranges from a few thousand to hundreds of thousands of hits per minutes. In response to web traffic growth, the concept of a three-active cluster was developed, which includes three geographically dispersed computer clusters over which all web traffic is balanced in order to provide infrastructure redundancy. In effect, the topology of a cloud is becoming a complex web of interconnected physical and virtual machines and networks. As the velocity, volume, and variety of data is increasing and the prevalence of analytics and algorithms grow while clouds mature in complexity and size, cognitive computing can create a positive human experience within the cloud.

For example, humans (e.g., human administrators, users, and customers) should be able to ask a cloud natural questions to understand the current state of shared resources within the cloud. The present invention allows for asking a cloud a question through a visual part that takes input from a human within natural language (e.g., How many servers did you predict we need in 1 hour?) and can also take scenario based input. Aspects of the invention may also include a back-end part that can understand the question, scenarios, and derived models thereof to provide answers.

The present invention also allows for having a conversation with a cloud through a visual part that can handle conversations and questions about big data and infrastructure (e.g., Which player during a sporting event caused the most impact to the infrastructure?). In embodiments, big data can be defined as a collection of data sets so large and complex that it becomes difficult to process using on-hand database management tools or traditional data processing applications. Aspects of the invention may also include a back-end part that accepts data about a cloud and continuously finds patterns to respond within the context of the conversation and questions.

The present invention also allows for cognitive cloud visualization through a visual part that shows how the cloud is using unstructured information management architecture (UIMA). In embodiments, UIMA is component software architecture for the development, discovery, composition, and deployment of multi-modal analytics for the analysis of unstructured information and its integration with search technologies. Aspects of the invention may also include a back-end part that opens the data through representational state transfer (RESTful) services.

The present invention also allows for computational intelligence as a service through a back-end part that that includes Statistical Product and Service Solutions (SPSS®) Modeler Server, SPSS Modeler Desktop, SPSS Catalyst, Yago, Wordnet®, Verbnet, and etc. In embodiments, SPSS Modeler Server and related hardware and software packaging is used for surveying, authoring, and deploying statistical data collection and analysis services including data mining, data analytics, and scoring services. (SPSS is a trademark of International Business Machines Corporation registered in many jurisdictions worldwide).

In accordance with aspects of the present invention, a human reacts to cloud performance or proactively wants to discover the health of the cloud. In embodiments, the human asks a cloud a question and the cloud determines if the question is a conversational class or a single question class. The question may be classified based on key words and phrases (e.g., quickly tell me, immediately, urgently, etc.). In embodiments, if the question is classified as a single question class, then the cloud may determine a type of introspection to use (e.g., recall, precision, or average) based on an amount of detail in the question. In embodiments, the cloud returns information and closes the session such that a conversation is avoided.

In embodiments, if the question is classified as conversational class, then the cloud may determine whether the question is regarding past performance or events or requesting a prediction of future performance or events. If the question is in regard to past performance or events, then the cloud may apply natural language processing to determine how the cloud was performing. If the question is in regard to prediction of future performance or events (e.g., forecasting), then the cloud may apply natural language processing to determine how the cloud will be performing. In embodiments, a recall oriented introspection algorithm may be utilized to minimize false negative responses. In accordance with these aspects, the human may respond with additional or supplemental information in response to how the cloud was or will be performing to introduce more natural language and narrow down the scope of the cloud introspection.

In embodiments, the human may provide input to the precision/recall/combination introspections with labels such that the cloud may learn how to answer questions and hold a conversation. For example, in embodiments, if the human continues to ask general questions to the recall introspection about the same topic, an exemplar may be created that marks the mapping from question to cloud ontology as incorrect. On the other hand, if the human asks general questions from a precision introspection, the algorithm may adjust a precision oriented threshold. In additional embodiments, the cloud may teach the human how to ask questions. For example, the cloud may offer related terms to try that were just outside of the recall/precision/combination introspections.

As a result, by asking the cloud natural questions or having a natural language conversation with the cloud, the present invention allows for a human to explore application data across the system. Accordingly, the present invention allows for a system of devices, e.g., cloud based digital platform delivery system, a computer network, a server network, etc., to provide for the ability to gain a deep insight about the cloud through natural interaction. Thus, the present invention can provide: (i) enhancement of human cognitive abilities; (ii) natural interaction between humans and cloud technologies; and (iii) cloud technologies that learn with use.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Moreover in accordance with aspects of the invention, program/utility 40 can include programming instructions to provide functionality of cognitive module 102, e.g., the processes described herein. Cognitive module 102 can be implemented as one or more program code in program/utility 40 stored in memory 28 as separate or combined modules. Additionally, cognitive module 102 may be implemented as separate dedicated processors or a single or several processors or has dedicated program instructions to provide the function to these tools. In embodiments, cognitive module 102 can perform cognitive computing by using one or more modules such as introspective module 104, ontology mapping module 106, and forecasting module 108 as separate or combined modules as implemented by program/utility 40. In embodiments, introspective module 104 receives an inquiry or question and determines the type of introspection to use; ontology mapping module 106 maps introspection tags to analytics; and forecasting module 108 simulates ahead of the horizon health metrics and forecasting.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments, devices 110-1, 110-2, . . . , 110-N (hereinafter referred to as device 110 in the singular and devices 110 in the plural) can facilitate a human asking a question or carrying out a conversation relating to an event from server 12. Device 110 can be a laptop, desktop computer, smart-phone, tablet, and/or any other computing device capable of viewing web page content and/or receiving and/or sending web page content, textual messages, and/or other types of information from other devices.

In embodiments, device 110 can facilitate a human asking a question or carrying out a conversation relating to an event (e.g., a live event, such as a golf tournament). For example, a user may use device 110 to inquire about information about a particular participant (e.g., Which player caused the most impact to the infrastructure?) within the event. Thus, when the user sends the inquiry from device 110, there may be other devices 110 sending inquiries at the same time. In embodiments, an input/output device (e.g., a microphone, a keyboard, touch screen, etc.) may be used with device 110 to facilitate the human asking a question or carrying out a conversation.

In embodiments, the inquiry can also be sent to server 12, and cognitive module 102 can use the inquiry to interact with humans naturally. In embodiments, the natural interaction may include receiving and answering questions, and carrying out a conversation regarding past or future events. For example, the cloud may accept the questions, and apply natural language processing to generate domain specific and domain independent answers. The cognitive module 102 may use cloud based ontology to map introspection tags to analytics that measure the health or performance of the cloud. Thus, the cognitive module 102 can determine how the cloud was performing in the past.

Additionally, or alternatively, the cognitive module 102 may use forecasting algorithms to to simulate ahead of the horizon health or performance metrics and horizon forecasting. Thus, the cognitive module 102 can determine how the cloud will be performing in the future. With the cognitive cloud, a human is empowered to explore and independently discover trends and patterns with data. In embodiments, the cognitive module 102 can use one more modules to generate the answers and allow humans to explore the data, such as introspection module 104, ontology mapping module 106, and forecasting module 108.

In embodiments, introspection module 104 receives input information (e.g., via I/O interfaces 22) that includes an inquiry or question, and determines the type of introspection to use (e.g., recall/precision/average) based on the amount of detail in the inquiry or question. For example, introspection module 104 may determine that recall would be effective for answering the inquiry or question based on a number of relevant items in the population or domain pertaining to the inquiry or question.

In embodiments, ontology mapping module 106 maps introspection tags to analytics that measure the health or performance of the cloud. In embodiments, ontology mapping module 106 extracts concepts, determines correspondences between concepts, maps introspective tags to analytical concepts, and retrieves those concepts in response to the question or inquiry. In some embodiments, the tag ontologies may correlate to natural language words, focus, and entities.

In embodiments, forecasting module 108 uses time series autoregressive integrated moving average (ARIMA) methods to simulate ahead of the horizon health or performance metrics. In embodiments, forecasting module 108 may also use forecast based event algorithms to simulate ahead of the time horizon forecasting. Additionally or alternatively, forecasting module 108 may use symbiosis to predict fault tolerance, disk failures, etc for additional forecasting health or performance.

Figure 2:
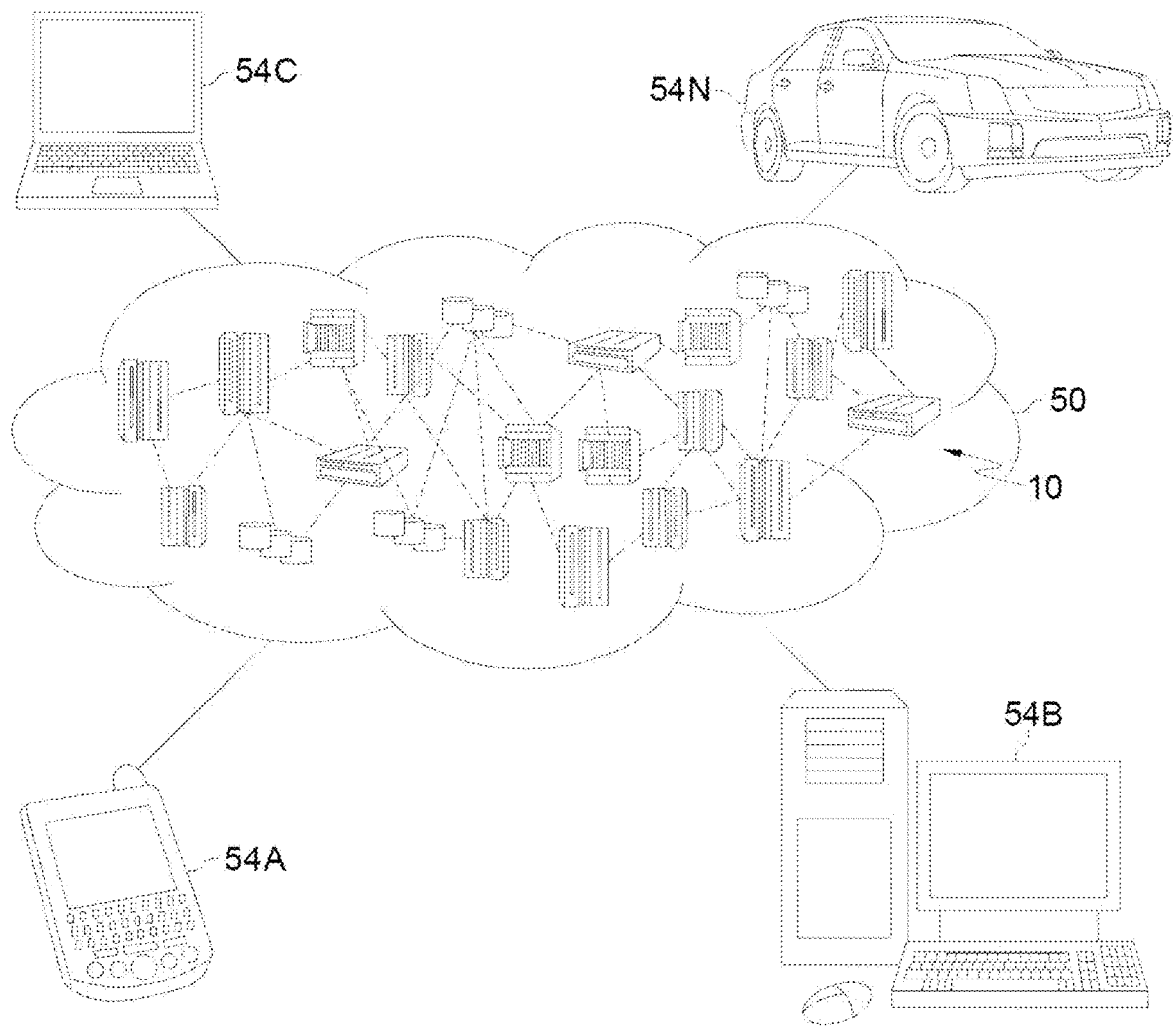
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
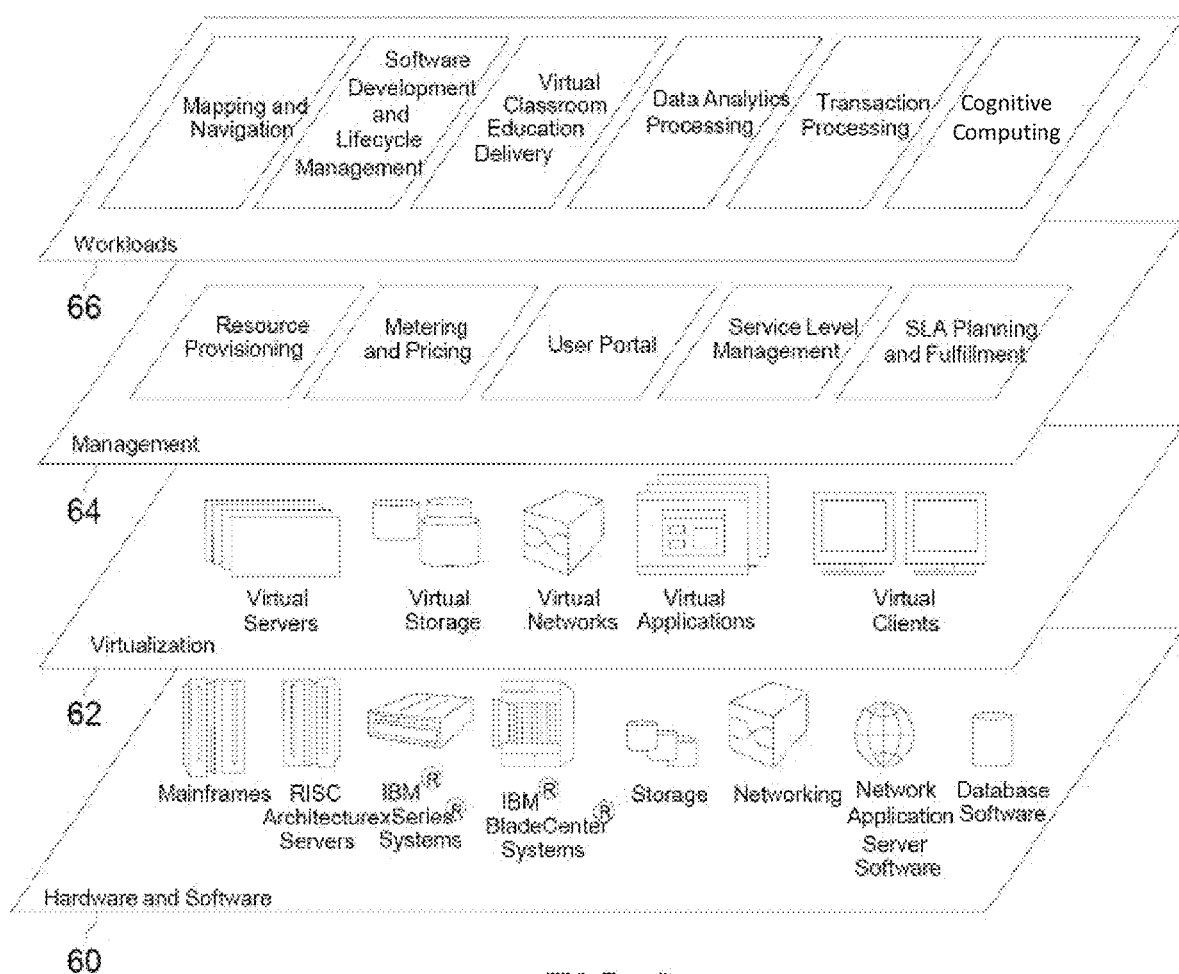
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cognitive computing. In accordance with aspects of the invention, the data analytics processing and cognitive computing workload/functions operate to perform one or more of the processes of cognitive module 102 described herein.

As will be appreciated by one skilled in the art, aspects of the present invention, including cognitive module 102 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
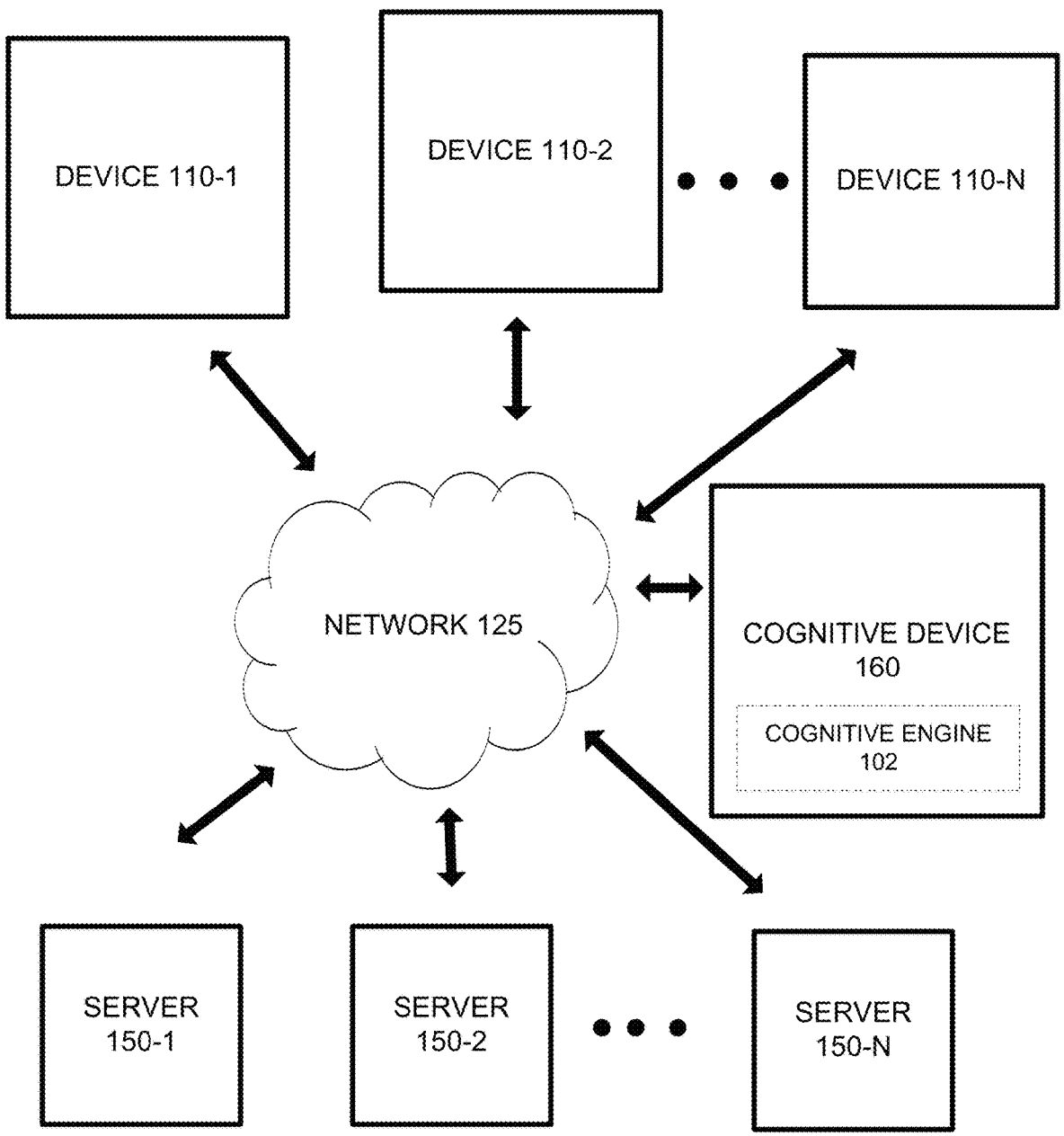
FIG. 4 is an example network diagram in accordance with aspects of the present invention.

FIG. 4 shows an example network diagram in accordance with aspects of the invention. FIG. 4 shows devices 110-1, 110-2, . . . , 110-N, network 125, servers 150-1, 150-2, . . . , 150-N (hereinafter referred to as server 150 in the singular and servers 150 in the plural) and cognitive device 160. While FIG. 4 shows a particular quantity of each type of device and/or network, there may be additional or fewer devices, servers, and/or networks. In embodiments, network 125, servers 150, and/or cognitive device 160 can be part of cloud computing environment 50 as described in FIG. 2.

In this example, devices 110 may include any computation or communication device that is capable of communicating with a network (e.g., network 125). For example, devices 110 can be similar to devices 54A-N shown in FIG. 2, and may include a laptop, desktop computer, smart-phone, tablet, or any other type of computing device. Accordingly, devices 110 can receive and/or display content, which can include, for example, objects, data, images, audio, video, text, and/or links to files accessible via one or more networks. Devices 110 can submit inquiries to servers (e.g., website server 150) regarding a particular event (e.g., a sporting event, a political event, a charitable event, etc.). Based on current inquiries from devices 110, the servers may forward the questions or conversational correspondence to cognitive device 160, which can generate answers or interrelated conversational correspondence for devices 110, as discussed in greater detail in FIGS. 5, 6, 7, 10, and 11.

Network 125 may correspond to environment 50 of FIG. 2, and may include one or more networks that allow for communication between different devices (e.g., devices 110, cognitive device 160, etc.). In embodiments, network 125 can comprise the Internet, an intranet, local area network (LAN), wide area network (WAN), a GPS network, radio access network, a wireless fidelity (Wi-Fi) network, a Worldwide Interoperability for Microwave Access (Wi-MAX) network, a cellular network, and/or a combination of these or other networks.

Servers 150 may include any computation or communication device that is capable of communicating with a network (e.g., network 125). In embodiments, servers 150 can provide data and information to cognitive device 160. For example, servers 150 can be associated with social networking systems, text messaging systems, websites, content providers (e.g., television, music, movies, etc.) and/or any other system that can provide data/information. Thus, servers 150 can be servers used to host websites about events, servers that can be a part of a cloud network (such as described in FIGS. 2-3), servers that provide services to social networking websites, and/or servers that can be provisioned on an as-needed basis based on information received from cognitive device 160.

Cognitive device 160 can include one or more computational devices that can allocate the computing resources (e.g., memory, processing units, etc.) to meet the inquires for content/information from devices 110, as described in FIG. 1. In embodiments, cognitive device 160 can include cognitive module 102 (as described in FIG. 1) to respond to inquiries with answers or interrelated conversational correspondence. Additionally, cognitive device 160 can be a part of computer/system server 12 also described in FIG. 1 and/or a cloud computing node 10 as described in FIG. 1. In embodiments, cognitive device 160 can receive data/information from servers 150 and extract information that can be used to generate answers or interrelated conversational correspondence. Furthermore, cognitive device 160 can use current data/content from devices 110 in combination with historical information and information from servers 150 to provide answers or interrelated conversational correspondence.

Figure 5:
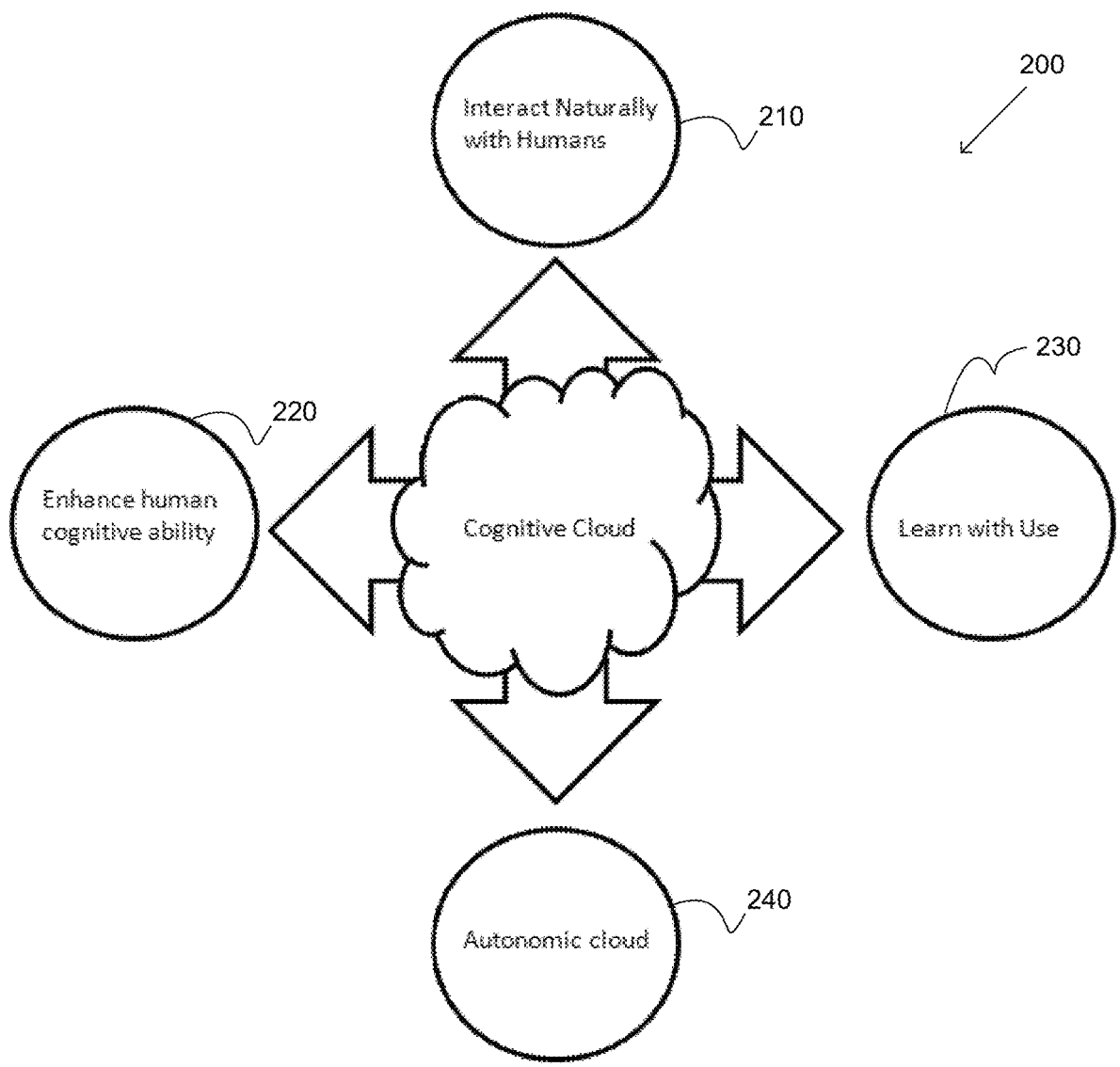
FIG. 5 shows an example of a cognitive cloud in accordance with aspects of the present invention.

FIG. 5 shows a concept of a cognitive cloud or distributed network 200 in accordance with aspects of the invention. In embodiments, cognitive cloud 200 may be configured to interact with humans naturally, as shown via principle 210. For example, humans, e.g., human administrators, users, and customers, may be able to ask cognitive cloud 200 natural questions to understand the current state of shared resources. In embodiments, humans can ask cognitive cloud 200 domain specific or domain independent questions such that humans can explore application data across the system. Through these natural interactions, humans may gain a deeper insight about cognitive cloud 200, which enhances a human's cognitive ability to understand cognitive cloud 200, as shown via principle 220. In embodiments, as cognitive cloud 200 gains data, reinforcement metrics, and cognitive computing algorithms through symbiotic growth, cognitive cloud 200 may learn how to operate within the demands of its shared services, as shown via principle 230. In embodiments, cognitive cloud 200 may be considered autonomic from predictive, prescription, and description cloud technologies and infrastructure as an IaaS, as shown via principle 240.

Figure 6:
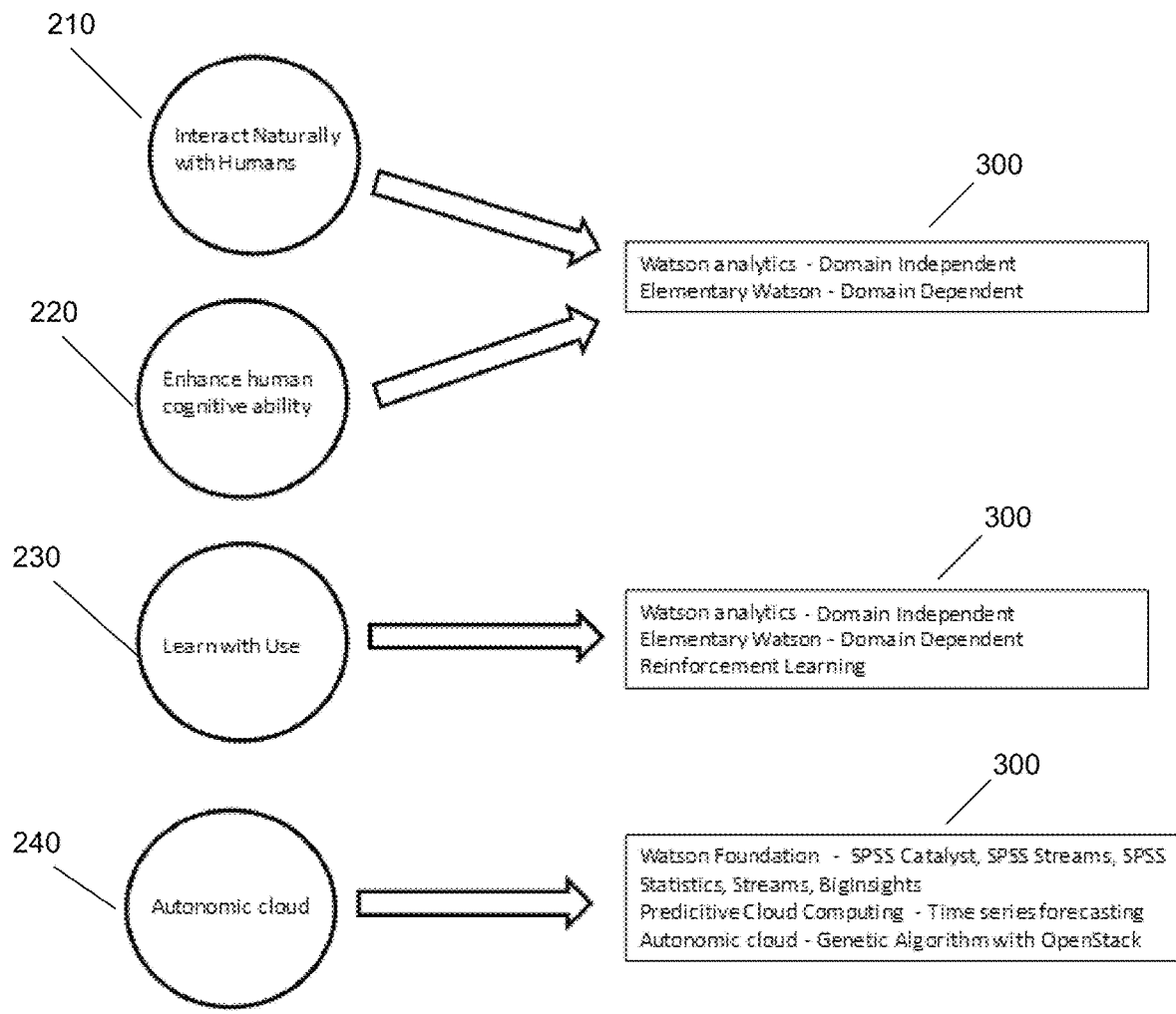
FIG. 6 shows mapping from cognitive cloud principles to technology enablers in accordance with aspects of the present invention.

FIG. 6 shows a mapping from cognitive cloud principles 210, 220, 230, and 240 to technology enablers 300 in accordance with aspects of the present invention. In embodiments, natural interaction with humans (principle 210) may be provided via technology enablers 300 (e.g., computer system/server 12 as described with respect to FIG. 1) such as Watson, which includes cognitive technology (e.g., cognitive module 102 as described with respect to FIG. 1) that processes information more like humans than a computer by understanding natural language and generating hypotheses based on evidence. For example, Watson analytics may be provisioned within a cloud to interact naturally with humans to answer domain independent questions; while on the other hand, Watson elementary may be provisioned within the cloud to interact naturally with humans to answer domain dependent questions.

In embodiments, enhanced human cognitive ability (principle 220) may also be provided via technology enablers 300 (e.g., computer system/server 12 as described with respect to FIG. 1) such as Watson, which includes cognitive technology (e.g., cognitive module 102 as described with respect to FIG. 1) that processes information more like humans than a computer by understanding natural language, generating hypotheses based on evidence, and providing in depth answers to simple or complex inquires. For example, Watson analytics may be provisioned within a cloud to answer domain independent questions, which enhances a human's cognitive ability to understand domain independent issues; while on the other hand, Watson elementary may be provisioned within the cloud to answer domain dependent questions, which enhances a human's cognitive ability to understand domain dependent issues.

In embodiments, learning with use (principle 230) may also be provided via technology enablers 300 (e.g., computer system/server 12 as described with respect to FIG. 1) such as Watson, which includes cognitive technology (e.g., cognitive module 102 as described with respect to FIG. 1) that processes information more like humans than a computer by understanding natural language, generating hypotheses based on evidence, and performing machine learning including reinforcement learning. For example, Watson analytics may be provisioned within a cloud to learn with use based on domain independent questions; while on the other hand, Watson elementary may be provisioned within the cloud to learn with use based on domain dependent questions.

In embodiments, autonomic cloud (principle 240) may be provided via technology enablers 300 (e.g., computer system/server 12 as described with respect to FIG. 1) such as Watson, which includes cognitive technology (e.g., cognitive module 102 as described with respect to FIG. 1). Technology enablers 300 may further include software and/or hardware (e.g., introspective module 104, ontology mapping module 106, and forecasting module 108 as described with respect to FIG. 1), such as SPSS Catalyst, SPSS Modeler Streams, SPSS Statistics, InfoSphere® Streams, and BigInsights™, configured for managing large volumes of structured and unstructured data, predictive analysis of big data, generating interactive visuals and plain language summaries of predictive analytics, building and manipulating data streams, and performing statistical analysis of big data. (Infosphere and BigInsights are trademarks of International Business Machines Corporation registered and unregistered in many jurisdictions worldwide).

In embodiments, technology enablers 300 may further include software and/or hardware (e.g., introspective module 104, ontology mapping module 106, and forecasting module 108 as described with respect to FIG. 1), such as Smart Cloud Orchestrator® built on an open standards such as OpenStack®, configured for time series forecasting, and autonomic computing using genetic algorithms. Smart Cloud Orchestrator is a cloud management platform for managing computing infrastructures. In embodiments, the Smart Cloud Orchestrator may enable dynamic cloud service delivery and provide flexible orchestration. OpenStack is a cloud computing project that converts the traditional infrastructure management into software. The software configuration supports the infrastructure as an IaaS paradigm.

In embodiments, such as those pertaining to IaaS, a semi-supervised algorithm may be configured to integrate the current state of the cloud with open stack patterns. For example, sensors and monitors deployed within the cloud may be configured to collect and funnel data to software and/or hardware, such as BigInsight, to map and reduce data together. Furthermore, metrics such as CPU, disk space, disk In/Out, and memory may be inputs into a genetic algorithm. In embodiments, the genetic algorithm encodes which patterns to invoke on bootstrapped virtual machines.

A predictive cloud may be configured to provision and allocate cloud computing resources ahead of an event's time horizon and demand curve by applying predictive analytics and forecasting. Within the context of tennis and golf, the cloud resource forecast may be derived from game day patterns and infrequent events such as a playoff, key plays, and etc. A predictive cloud system may include (i) long, medium, and short term forecasting, (ii) social based forecasting, (iii) sporting domain dependent factors, (iv) a combination of time varying cyclic forecasting and event based prediction, and (v) predictive provisioning on a three-sited cloud.

Flow Charts

Figure 7:
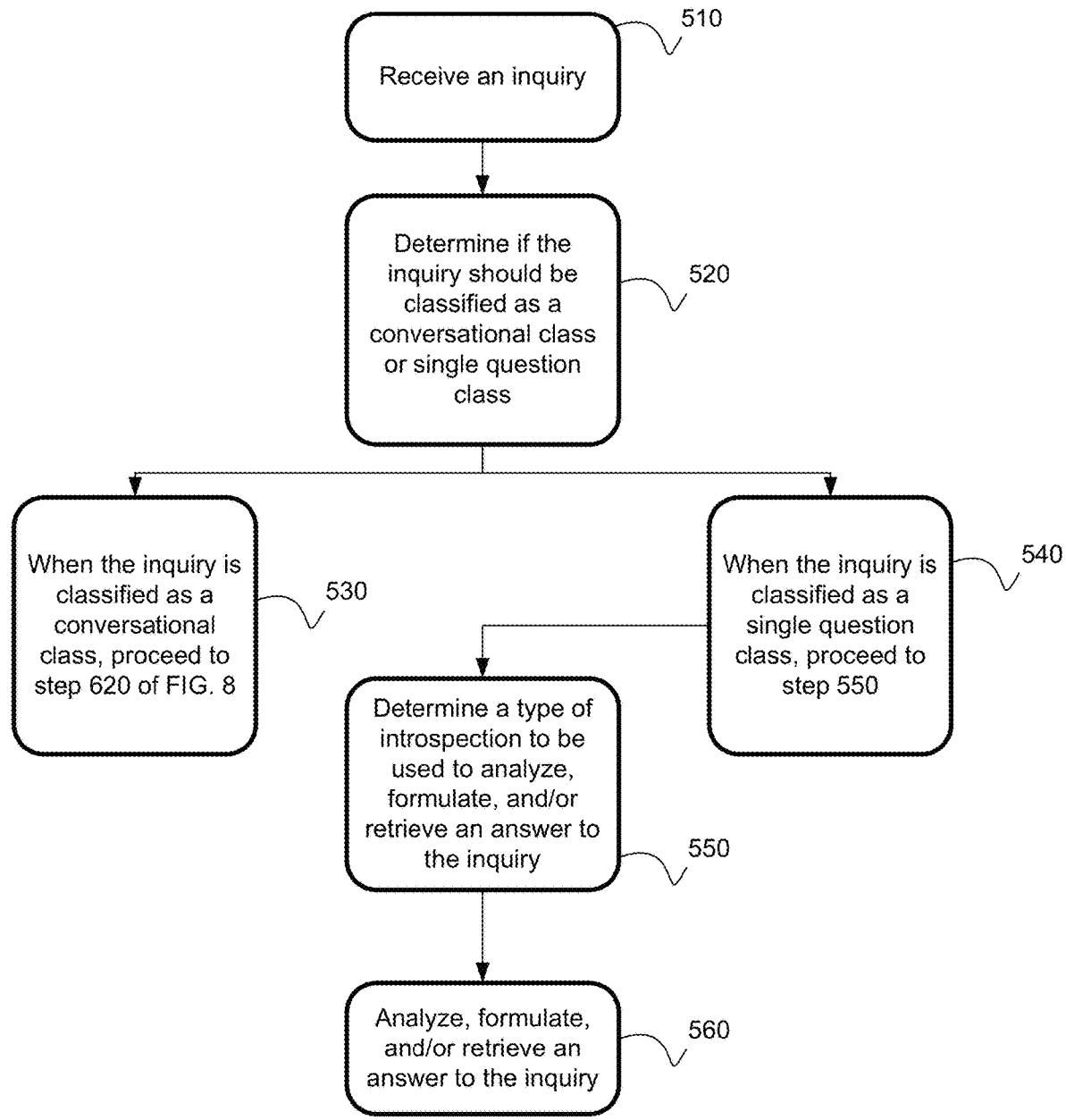
FIG. 7 shows an example flow in accordance with aspects of the present invention.
Figure 10:
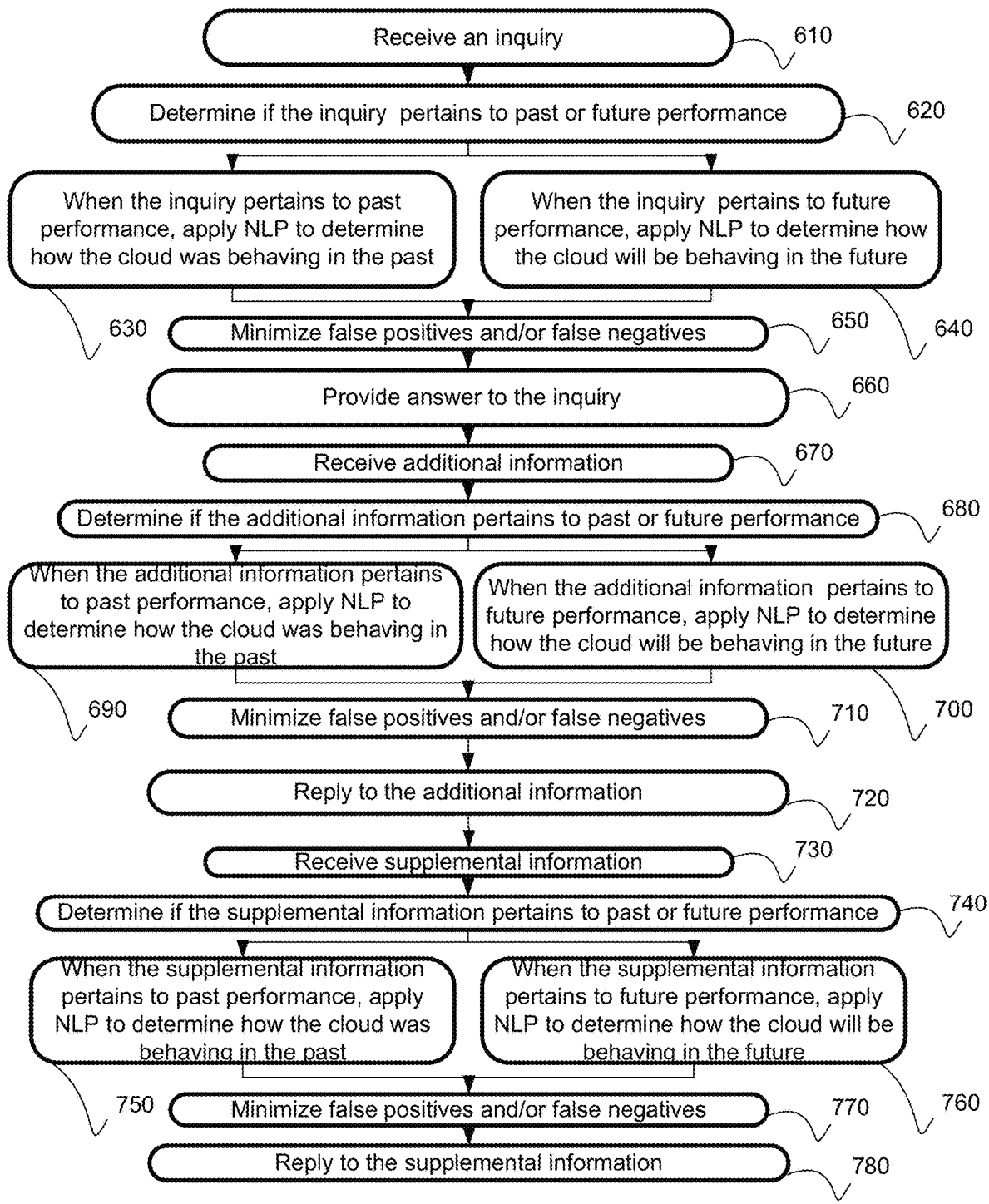
FIGS. 10 and 11 show example flows in accordance with aspects of the present invention.
Figure 11:
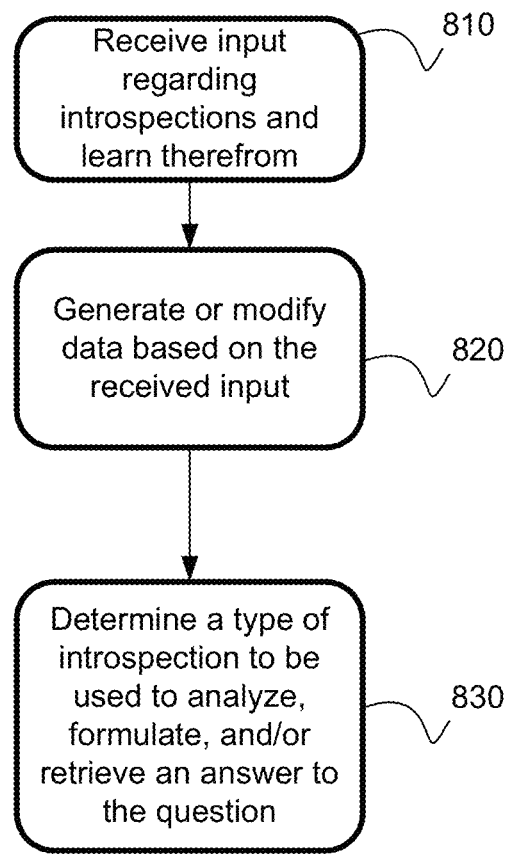

FIGS. 7, 10, and 11 show example flows for providing answers or interrelated conversational correspondence on a computing system in accordance with aspects of the present invention. The steps of FIGS. 7, 10, and 11, may be implemented in one or more of the environments of FIGS. 1-6 for example.

FIG. 7 is an example flow for asking the cloud a question in accordance with aspects of the present invention. In embodiments, a cognitive device provides answers based on one or more event-related features that will generate information before, during, and/or after the event. For example, in a golf tournament, the event-related features may be particular golfers, a hole (e.g., the ninth hole, the eighteenth hole, etc.), popularity of a golfer, the proximity to lead, etc., that result in an infrastructure administrator asking the question "How many servers did you predict we need in 1 hour?".

Figure 8A:
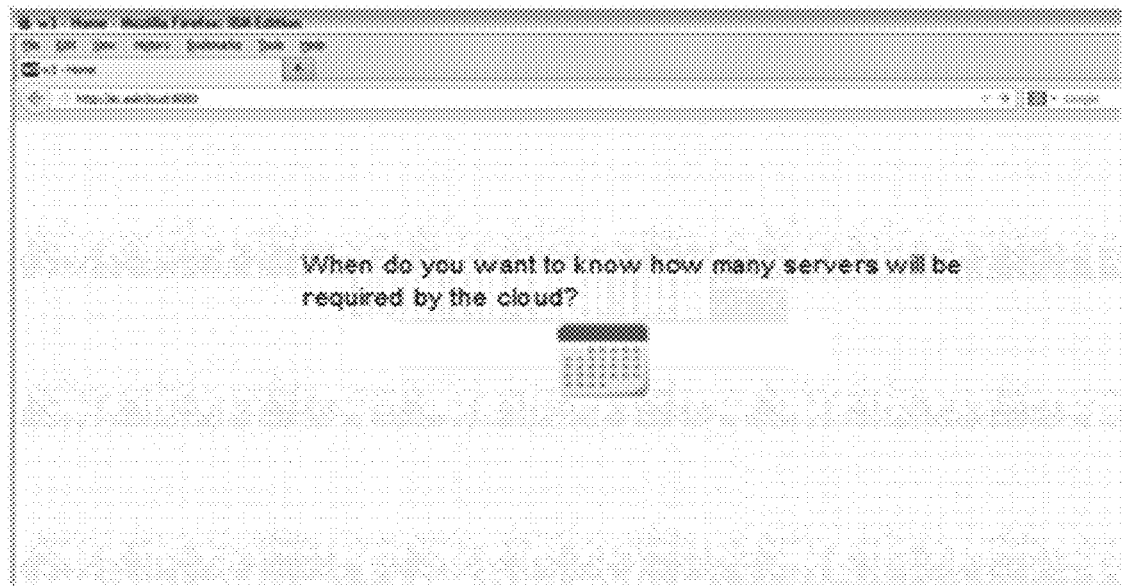
FIGS. 8a, 8b, 9a, and 9b show example screen shots in accordance with aspects of the present invention.
Figure 8B:
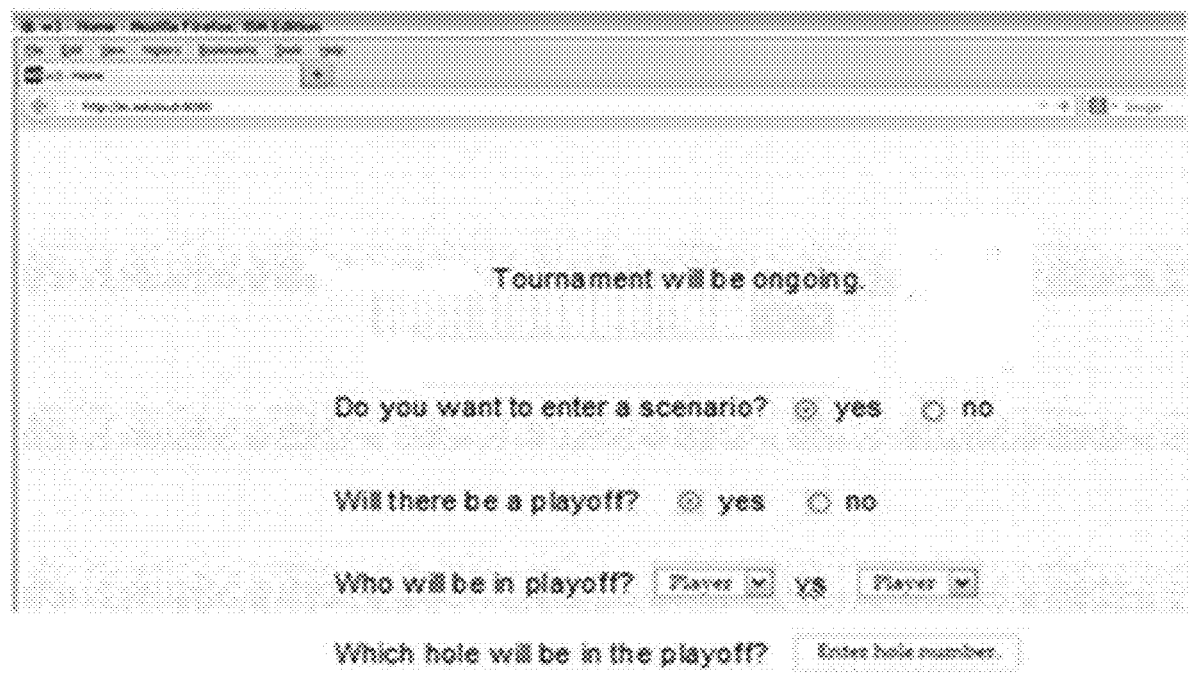

At step 510, a cognitive device (e.g., cognitive device 160 running cognitive module 102 as described in FIG. 4) receives a question or conversational correspondence. In embodiments, the question or conversational correspondence may be received by a device (e.g., device 110 as described with respect to FIG. 1) in response to a human reacting to cloud performance or a human proactively wanting to discover a health or performance of the cloud. For example, the present invention allows for asking the cloud a question through a visual part (e.g., a visual interface) that takes input from a human using natural language (e.g., How many servers did you predict we need in 1 hour?) and can also take scenario based input (e.g., will there be a playoff? and which hole will be the playoff?), as illustrated in the screenshots shown in FIGS. 8a and 8b.

With reference back to FIG. 7, at step 520, the cognitive device determines if the question or conversational correspondence should be classified as a conversational class or a single question class. In embodiments, this determination may be made by the cognitive device classifying the question or conversational correspondence based on key words and phrases within the received question or conversational correspondence. For example, if the question or conversational correspondence (i.e., inquiry) has natural language including the words or phrases "quickly tell me", "immediately", or "urgent", then the cognitive device may be configured to classify the question or conversational correspondence as a single question class. On the other hand, if the question or conversational correspondence (i.e., inquiry) has natural language pertaining to a string of inquiries, complex issues, and/or in-depth or non-urgent words such as "tell me about" and "what would happen if", then the cognitive device may be configured to classify the question or conversational correspondence as a conversational class At step 530, when the cognitive device determines the inquiry is classified as a conversational class, the cognitive device may accept the inquiry and proceed to step 620 of FIG. 10 for further analysis and processing.

At step 540, when the cognitive device determines the inquiry is classified as a single question class, the cognitive device may accept the inquiry and proceed to step 550 for further analysis and processing.

At step 550, the cognitive device may determine a type of introspection (e.g., recall, precision, or average) to use for analysis and answering the inquiry or question based on an amount of detail provided in the question. For example, it should be understood that recall is a fraction of information that is relevant to the question that may be successfully retrieved based on the detail provided in the question, precision is a fraction of the information retrieved that is relevant to the question based on the detail provided in the question, and average (e.g., average precision) is an average value of plotting precision of recall and precision over a predetermined temporal interval based on the detail provided in the question. Accordingly, if the question has enough detail to provide a higher fraction of recall, then recall introspection may be used for analyzing, formulating, and/or retrieving an answer to the question. In embodiments, it should be further understood that the cognitive device may use any one or combinations of introspection to accurately and efficiently formulate and/or retrieve the answer to the question.

Figure 9A:
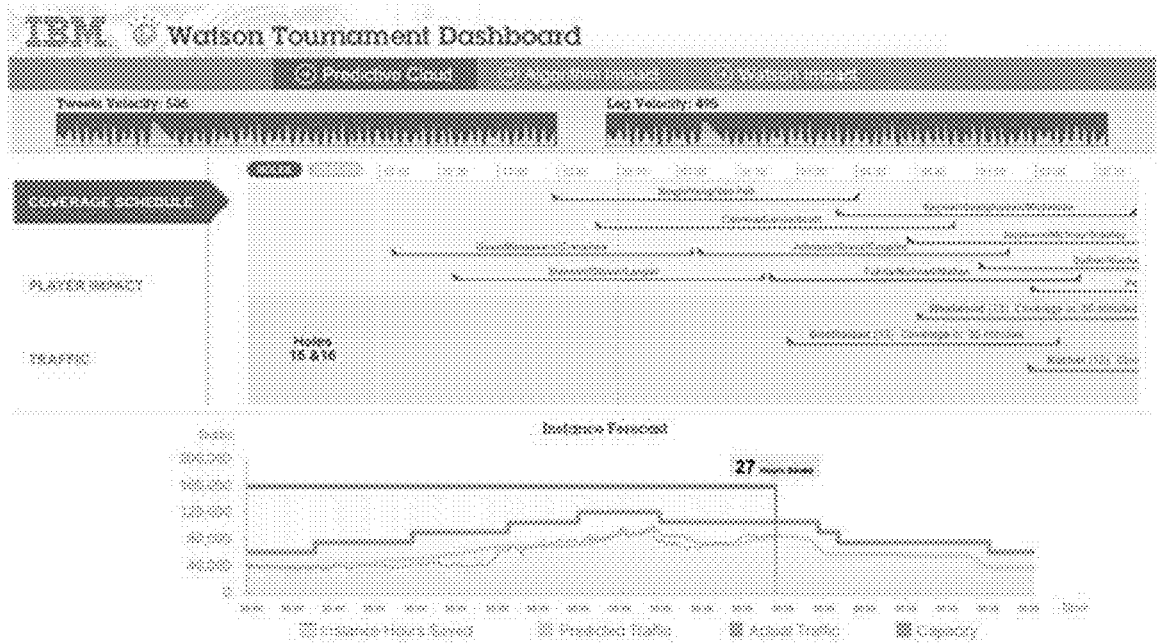
Figure 9B:
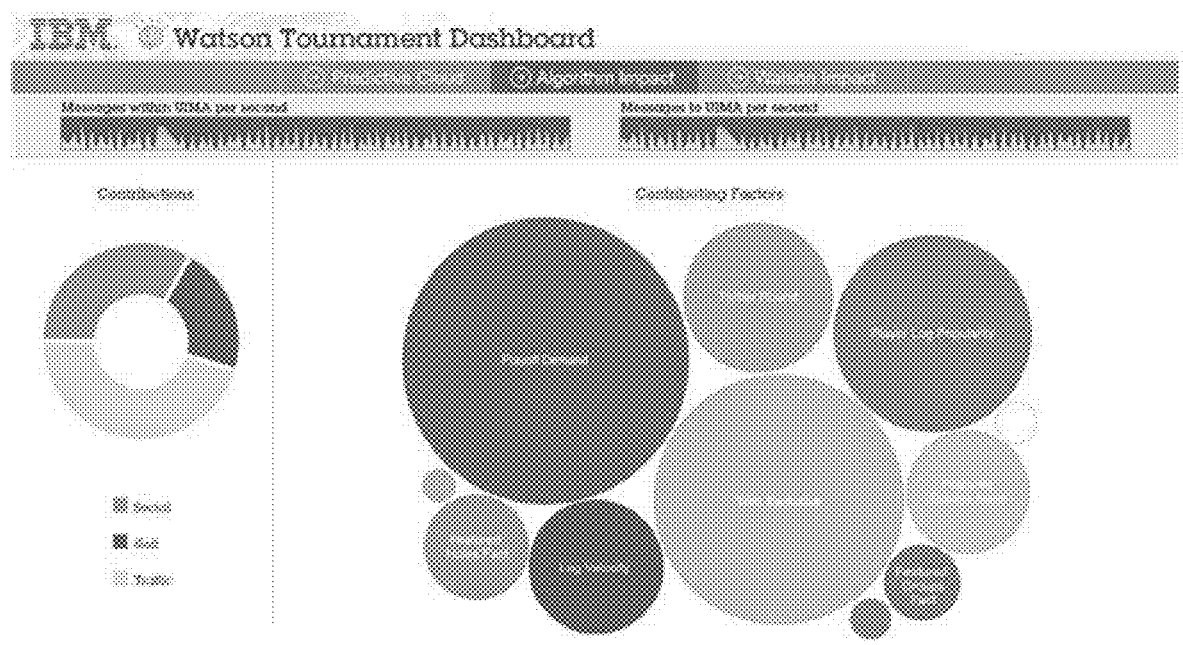

At step 560, the cognitive device may use the determined type of introspection to analyze, formulate, and/or retrieve an answer to the question from a collection of information and resources available to the cognitive device. For example, the cognitive device may answer the question or conversational correspondence using natural language text. In additional or alternative embodiments, the cognitive device may present a visual piece or cognitive cloud visualization that shows how the predictive cloud is using UIMA with graphic illustration (e.g., charts) displayed on a device (e.g., device 110 as described with respect to FIG. 1), as illustrated in the screenshots shown in FIGS. 9a and 9b. In embodiments, once the answer is formulated and/or retrieved, the cognitive device may provide the answer to the human and close the session such that a conversation with the human is avoided.

FIG. 10 is an example flow for having a conversation with the cloud in accordance with aspects of the present invention. In embodiments, a cognitive device provides answers or conversational correspondence based on one or more event-related features that will generate information before, during, and/or after the event. For example, in a golf tournament, the event-related features may be particular golfers, a hole (e.g., the ninth hole, the eighteenth hole, etc.), popularity of a golfer, the proximity to lead, etc., that result in an infrastructure administrator asking the question "Which player caused the most impact to the infrastructure?".

At step 610, a cognitive device (e.g., cognitive device 160 running cognitive module 102 as described in FIG. 4) receives a question or conversational correspondence (i.e., an inquiry) from a device (e.g., device 110 as described with respect to FIG. 1). In embodiments, the question or conversational correspondence may be received in response to a human reacting to cloud performance or a human proactively wanting to discover a health or performance of the cloud.

At step 620, the cognitive device accepts the question or conversational correspondence and determines whether the question or conversational correspondence pertains to past performance or future performance of the cloud. For example, the cognitive device may determine whether the natural language of the question or conversational correspondence pertains to events that occurred in the past or require a simulation or prediction of events that could occur in the future (e.g., a temporal account of events discussed within the question or the conversational correspondence).

At step 630, when the question or conversational correspondence pertains to past performance, the cognitive device applies NLP to the question or conversation correspondence to determine how the cloud was functioning or performing in the past. In embodiments, the cognitive device may be configured to use cloud based ontology to map introspection tags to analytics that measure the health or performance of the cloud. The tag ontologies may be correlated to natural language words, focus, and/or entities.

At step 640, when the question or conversational correspondence pertains to future performance, the cognitive device applies NLP to the question or conversation correspondence to determine how the cloud will be functioning or performing in the future (i.e., the cloud would have to introspect itself). In embodiments, the cognitive device may be configured to apply forecasting based algorithms that use time series ARIMA methods to simulate ahead of the horizon metrics. The applied forecasting based event algorithms may also be configured to simulate ahead of the time horizon forecasting. In additional or alternative embodiments, symbiosis may be used to predict fault tolerance, disk failures, etc. for additional health forecasting.

At step 650, the cognitive device may use a recall oriented introspection algorithm to minimize false negative responses to start a conversation with the human. In embodiments, false positive responses may be minimized by relaxing a threshold of NLP questions to cloud ontology relationships developed in step 630.

At step 660, the cognitive device may answer the question or conversational correspondence using the determined performance of the cloud in the past or predicted performance of the cloud in the future in view of the recall oriented introspection and/or relaxed threshold of NLP questions. For example, the cognitive device may answer the question or conversational correspondence using natural language text. In additional or alternative embodiments, the cognitive device may present a visual piece or cognitive cloud visualization that shows how the predictive cloud is using UIMA with graphic illustration (e.g., charts) displayed on a device (e.g., device 110 as described with respect to FIG. 1).

At step 670, the cognitive device may receive additional information (e.g., additional questions or conversational correspondences) in response to the answer provided in step 660. In embodiments, the additional information may be received in response to a human reacting to the determined performance of the cloud in the past or predicted performance of the cloud in the future. In accordance with these aspects of the invention, the additional information may act to introduce additional natural language to narrow down the scope of the cloud introspection.

At step 680, the cognitive device accepts the additional information and determines whether the additional information pertains to past performance or future performance of the cloud. For example, the cognitive device may determine whether the additional information pertains to events that occurred in the past or require a simulation or prediction of events that could occur in the future.

At step 690, when the additional information pertains to past performance, the cognitive device applies NLP to the additional information to determine how the cloud was functioning or performing in the past. In embodiments, the cognitive device may be configured to use cloud based ontology to map introspection tags to analytics that measure the health of the cloud. The tag ontologies may be correlated to natural language words, focus, and entities.

At step 700, when the additional information pertains to future performance, the cognitive device applies NLP to the additional information to determine how the cloud will be functioning or performing in the future (i.e., the cloud would have to introspect itself). In embodiments, the cognitive device may be configured to apply forecasting based algorithms that use time series ARIMA methods to simulate ahead of the horizon metrics. The applied forecasting based event algorithms may also be configured to simulate ahead of the time horizon forecasting. In additional or alternative embodiments, symbiosis may be used to predict fault tolerance, disk failures, etc. for additional health forecasting.

At step 710, the cognitive device may use a midterm introspection algorithm that minimizes false positive responses and false negative responses and then projects to middle. At step 720, the cognitive device may reply to the additional information using the determined performance of the cloud in the past or predicted performance of the cloud in the future in view of the projected middle. For example, the cognitive device may reply to the additional information using natural language text. In additional or alternative embodiments, the cognitive device may present a visual piece or cognitive cloud visualization that shows how the predictive cloud is using UIMA with graphic illustration (e.g., charts) displayed on a device (e.g., device 110 as described with respect to FIG. 1).

At step 730, the cognitive device may receive supplemental information (e.g., supplemental questions or conversational correspondences) in response to the reply provided in step 710. In embodiments, the supplemental information may be received in response to a human reacting to the determined performance of the cloud in the past or predicted performance of the cloud in the future. In accordance with these aspects of the invention, the supplemental information may act to introduce more natural language to even more narrow down the scope of the cloud introspection.

At step 740, the cognitive device accepts the supplemental information and determines whether the supplemental information pertains to past performance or future performance of the cloud. For example, the cognitive device may determine whether the supplemental information pertains to events that occurred in the past or require a simulation or prediction of events that could occur in the future At step 750, when the supplemental information pertains to past performance, the cognitive device applies NLP to the supplemental information to determine how the cloud was functioning or performing in the past. In embodiments, the cognitive device may be configured to use cloud based ontology to map introspection tags to analytics that measure the health of the cloud. The tag ontologies may be correlated to natural language words, focus, and entities.

At step 760, when the supplemental information pertains to future performance, the cognitive device applies NLP to the supplemental information to determine how the cloud will be functioning or performing in the future (i.e., the cloud would have to introspect itself). In embodiments, the cognitive device may be configured to apply forecasting based algorithms that use time series ARIMA methods to simulate ahead of the horizon metrics. The applied forecasting based event algorithms may also be configured to simulate ahead of time horizon forecasting. In additional or alternative embodiments, symbiosis may be used to predict fault tolerance, disk failures, etc. for additional health or performance forecasting.

At step 770, the cognitive device may use a precision oriented introspection algorithm that minimizes false positive responses by using a threshold (e.g., a strict or dynamic threshold) between human question entities and cloud ontology terms. At step 780, the cognitive device may reply to the supplemental information using the determined performance of the cloud in the past or predicted performance of the cloud in the future in view of the precision oriented introspection. For example, the cognitive device may reply to the supplemental information using natural language text. In additional or alternative embodiments, the cognitive device may present a visual piece or cognitive cloud visualization that shows how the predictive cloud is using UIMA with graphic illustration (e.g., charts) displayed on a device (e.g., device 110 as described with respect to FIG. 1). Advantageously, in accordance with these aspects of the present invention, the human may receive an answer that is highly precise to the past or future health conditions or performance of the cloud.

FIG. 11 is an example flow for both human and cloud learning. At step 810, the cognitive device (e.g., cognitive device 160 running cognitive module 102 as described in FIG. 4) may receive input to the introspections or responses provided by the cognitive device including precision, recall, average, or combinations thereof. In embodiments, the input to the introspections may include labeled examples e.g., input where the desired output is known. At step 820, in response to receiving the input with labels, the cognitive device may generate data or modify preexisting data to reflect learning through the received labels, i.e., a form of supervised or semi-supervised learning. For example, if the human continues to ask general questions during the processes of FIG. 10 to recall introspections about a same topic, then an exemplar may be created by the cognitive device that marks the mapping from question to cloud ontology, performed in steps 630, 690, and 750 (described with respect to FIG. 10), as incorrect. Additional or alternatively, if the human asks general questions from a precision introspection, the cognitive device may adjust the threshold of the precision oriented introspection algorithm.

At step 830, the cognitive device may make a suggestion (e.g., teach) to help refine questions being asked of the cognitive device such that the questions are more applicable to a particular topic or domain. For example, the cognitive device may offer related terms that the human may try incorporating into their questions or conversation correspondences that were just outside of the introspections including precision, recall, average, or combinations thereof.

As should be understood, a conversational approach to analytics integrates computational analytics with human performed analytics. A human knowledge worker is empowered to explore and independently discover trends and patterns with data. The computational analytics consumes the human discovery to find hidden relations in the data to increase the possibility of a serendipitous discovery or a pleasant finding by accident. For example, cognitive cloud analytics provides a natural language interface to graphically explore data and interact with data.

In embodiments, a cognitive cloud can be trained to be an advisor within a particular domain. For sporting events the cloud can be trained to become a super commentator. A base corpus will consist of Wikipedia® and augmented by sporting specific trivia and statistics. All of the data corpus sets that are ingested will be preprocessed into Deep Question and Answer format to optimize recall from the data. Domain independent data such as wordnet, verbnet, and stop word lists may be maintained within the system.

Just as humans study for a test, a cognitive cloud may learn from an answer key during training adaptation. The cognitive cloud may take a question from an answer key and generate evidence based ranked hypotheses. Generally within the form a regular expression, the hypothesis may be compared to the actual answer. In embodiments, the logistic regression algorithms within the final merge and rank may use a Newton Raphson learning algorithm to minimize the error between answers and targets by changing the weights of each type of feature value. The answer key may be broken up into test, train, and development sets so that over training and over fit can be avoided.

Functional adaptation within a cognitive cloud creates new algorithms to put into UIMA pipelines. When new features are added, the models should be retrained and the base type system for UIMA should be updated. Additional domain specific features enable the system to create discriminating features or clues to help separate wrong from right answers within the final merge and rank system. Within sports, play statistics, schedules, historical performance, and world ranking annotators could provide additional dimensions of evidence for the cognitive cloud. Further, if prediction based outcomes from the predictive cloud computing system is to be utilized, a sporting prediction pipeline can be included into the overall UIMA system.

In embodiments, the invention provides a method that performs the process of the invention on a subscription, advertising, and/or fee basis. That is, a service provider, such as a Solution Integrator, could offer to provide answering functionality to an inquiry of a cognitive distributed network. In this case, the service provider can create, maintain, support, etc., a computer infrastructure, such as computer system 12 (as shown in FIG. 1) that performs the processes of the invention for one or more consumers. In return, the service provider can receive payment from the consumer(s) under a subscription and/or fee agreement and/or the service provider can receive payment from the sale of advertising content to one or more third parties In still another embodiment, the invention provides a computer-implemented method for answering an inquiry of a cognitive distributed network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for answering an inquiry of a cognitive distributed computer network, comprising:
   generating, by a computing device, an evidence based ranked hypothesis for a training inquiry;

comparing, by the computing device, the evidence based ranked hypothesis for the training inquiry with an actual answer from a key;

minimizing errors between the evidence based ranked hypothesis for the training inquiry with the actual answer from the key by using a Newton Raphson learning algorithm and changing weights of each type of feature value within a logistic regression algorithm;

receiving the inquiry at an introspective module of the computing device in the cognitive distributed computer network;

determining, by the computing device, a classification for the inquiry based on natural language of the inquiry;

classifying, by the computing device, the inquiry as a single question class;

determining, by the introspective module of the computing device, a type of introspection to be used by the cognitive distributed computer network on the inquiry to generate an answer to the inquiry, the type of introspection being based on an amount of detail provided in the inquiry;

suggesting, by the computing device, related terms which are related to the inquiry based on the amount of detail provided in the inquiry;

adjusting, by the computing device, a threshold of a precision oriented introspection algorithm that has the determined type of introspection for generating the answer to the inquiry by using related terms, from a previous inquiry, outside a predetermined threshold of the precision oriented introspection algorithm;

minimizing, by the computing device, false positive responses using the adjusted threshold of the precision oriented introspection algorithm;

generating, by the computing device, the answer to the inquiry using natural text and a cognitive cloud visualization which comprises a graphical chart that shows a predictive cloud using unstructured information management architecture based on the determined type of introspection, minimizing errors between the evidence based ranked hypothesis for the training inquiry with the actual answer from the key, and minimizing a number of false positive responses obtained using the adjusted threshold of the precision oriented introspection algorithm; and provisioning and allocating cloud computing resources for the cognitive distributed computer network based on the received inquiry, the generated answer to the inquiry, and the predictive cloud using unstructured information management architecture by applying predictive analytics and forecasting.

2. The method of claim 1, wherein the inquiry is received in response to a human wanting to discover a health of the cognitive distributed network through a visual interface that takes input from the human using the natural language.

3. The method of claim 1, wherein the determining the classification for the inquiry is based on key words and phrases within the natural language of the inquiry such that the inquiry is classified as the single question class in response to the inquiry including predetermined phrases or the inquiry is classified as a conversational class in response to the inquiry pertaining to a string of inquiries.

4. The method of claim 1, wherein the determined type of introspection is selected from the group consisting of recall, precision and average, and the determined type of introspection is used to analyze, formulate, and generate the answer to the inquiry using a collection of information and resources available to the computing device.

5. The method of claim 1, wherein a service provider at least one of creates, maintains, deploys and supports a computer infrastructure that includes the computing device.

6. The method of claim 1, wherein steps of claim 1 are provided by a service provider on at least one of a subscription, advertising, and fee basis.

7. The method of claim 1, further comprising a forecasting module which uses symbiosis to predict fault tolerance and disk failures, and minimizing false negative responses using a midterm introspection algorithm, projecting to a middle, and replying to additional information using a past or predicted performance of the cognitive distributed computer network in view of the projected middle.

8. A computer program product for answering an inquiry of a cognitive distributed computer network, the computer program product comprising a computer readable storage medium having program instructions embodied therewith, the program instructions readable and executable by a computing device to cause the computing device to:

generate, by the computing device, an evidence based ranked hypothesis for a training inquiry;

compare, by the computing device, the evidence based ranked hypothesis for the training inquiry with an actual answer from a key;

minimize errors between the evidence based ranked hypothesis for the training inquiry with the actual answer from the key by using a Newton Raphson learning algorithm and changing weights of each type of feature value within a logistic regression algorithm;

receive, by an introspective module of the computing device in the cognitive distributed computer network, the inquiry;

determine, by the computing device, a classification for the inquiry;

classify, by the computing device, the inquiry as a conversational class;

determine, by the computing device, whether the inquiry pertains to past performance or future performance of the cognitive distributed computer network;

in response to determining the inquiry pertains to the past performance, apply, by the computing device, natural language processing to the inquiry to determine how the cognitive distributed computer network was performing in the past using an ontology mapping module by mapping introspection tags to analytics correlating at least to a natural language;

in response to determining the inquiry pertains to the future performance, apply, by the computing device, the natural language processing to the inquiry to determine how the cognitive distributed computer network will be performing in the future using a forecasting module which simulates ahead of horizon metrics and forecasting by applying the natural language processing to questions or conversation correspondence;

suggest, by the computing device, related terms which are related to the inquiry based on the amount of detail provided in the inquiry;

adjust, by the computing device, a threshold of a recall oriented introspection algorithm by using related terms for generating a reply to the inquiry, from a previous inquiry, outside a predetermined threshold of the recall oriented introspection algorithm;

use, by the computing device, the adjusted threshold of the recall oriented introspection algorithm to minimize false negative responses;

reply, by the computing device, to the inquiry using natural text and a cognitive cloud visualization which comprises a graphical chart that shows how a predictive cloud is using unstructured information management architecture based on the determination of how the cognitive distributed computer network was performing in the past or will be performing in the future, minimized errors between the evidence based ranked hypothesis for the training inquiry with the actual answer from the key, and the use of the adjusted threshold of the recall oriented introspection algorithm; and provision and allocate cloud computing resources for the cognitive distributed computer network based on the received inquiry, the reply to the inquiry, and the predictive cloud using unstructured information management architecture by applying predictive analytics and forecasting, wherein the key comprises a training set.

9. The computer program product of claim 8, wherein the determining whether the inquiry pertains to the past performance or the future performance is based on natural language of the inquiry and a temporal account of events discussed therein.

10. The computer program product of claim 8, wherein in response to determining the inquiry pertains to the past performance, use, by the computing device, distributed network based ontology to extract concepts, determine correspondences between the concepts, map introspection tags to analytics that measure health and performance of the cognitive distributed computer network, and retrieve the concepts in response to the inquiry.

11. The computer program product of claim 10, wherein the mapped introspection tags are correlated to natural language words, focus, and entities.

12. The computer program product of claim 8, wherein in response to determining the inquiry pertains to the future performance, apply, by the computing device, forecasting based algorithms that use time series autoregressive integrated moving average methods to simulate ahead of the horizon health metrics and performance metrics.

13. The computer program product of claim 12, wherein the forecasting based algorithms are configured to simulate ahead of time horizon forecasting.

14. The computer program product of claim 8, wherein in response to determining the inquiry pertains to the future performance, use, by the computing device, symbiosis to predict fault tolerance and disk failures for health and performance forecasting of the cognitive distributed computer network.

15. The computer program product of claim 8, further comprising relax, by the computing device, a threshold of natural language processing questions to distributed network ontology relationships to minimize false positive responses, and the distributed network ontology relationships comprise mapped introspection tags to analytics that measure health and performance of the cognitive distributed computer network.

16. The computer program product of claim 8, further comprising receive, by the computing device, additional information provided in response to the reply to the inquiry and a reaction to the determined performance of the cognitive distributed computer network in the past, wherein the additional information includes additional natural language to narrow a scope of the inquiry and is received in response to a human reacting to how the cognitive distributed computer network was performing in the past.

17. The computer program product of claim 16, further comprising:

determine, by the computing device, whether the additional information pertains to the past performance or the future performance of the cognitive distributed computer network;

in response to determining the additional information pertains to the past performance, apply, by the computing device, the natural language processing to the additional information to determine how the cognitive distributed computer network was performing in the past; and in response to determining the additional information pertains to the future performance, apply, by the computing device, the natural language processing to the additional information to determine how the cognitive distributed computer network will be performing in the future.

18. The computer program product of claim 17, further comprising use, by the computing device, a midterm introspection algorithm to minimize false positive responses and false negative responses and projecting to a middle.

19. The computer program product of claim 18, further comprising reply, by the computing device, to the additional information using another natural text in the cognitive cloud visualization that shows how the predictive cloud is using unstructured information management architecture based on the determination of how the cognitive distributed computer network was performing in the past or will be performing in the future, and the use of the midterm introspection algorithm.

20. A system for answering an inquiry of a cognitive distributed computer network, comprising:

a CPU, a computer readable memory and a computer readable storage medium;

program instructions to generate an evidence based ranked hypothesis for a training inquiry;

program instructions to compare the evidence based ranked hypothesis for the training inquiry with an actual answer from a key;

program instructions to minimize errors between the evidence based ranked hypothesis for the training inquiry with the actual answer from the key by using a Newton Raphson learning algorithm and changing weights of each type of feature value within a logistic regression algorithm;

program instructions to receive the inquiry at an introspective module of a computing device in the cognitive distributed computer network;

program instructions to determine a classification for the inquiry using the computing device;

program instructions to classify the inquiry as a conversational class using the computing device;

program instructions to determine whether the inquiry pertains to past performance or future performance of the cognitive distributed computer network;

in response to determining the inquiry pertains to the past performance, program instructions to apply natural language processing to the inquiry to determine how the cognitive distributed computer network was performing in the past using an ontology mapping module;

in response to determining the inquiry pertains to the future performance, program instructions to the apply natural language processing to the inquiry to determine how the cognitive distributed computer network will be performing in the future using a forecasting module;

program instructions to suggest, by the computing device, related terms which are related to the inquiry based on the amount of detail provided in the inquiry;

program instructions to adjust a threshold of a recall oriented introspection algorithm by using related terms for generating a reply to the inquiry, from a previous inquiry, outside a predetermined threshold of the recall oriented introspection algorithm;

program instructions to use the adjusted threshold of the recall oriented introspection algorithm to minimize false negative responses using the computing device;

program instructions to reply to the inquiry using natural text and a cognitive cloud visualization which comprises a graphical chart that shows a predictive cloud using unstructured information management architecture based on the determination of how the cognitive distributed computer network was performing in the past or will be performing in the future using the computing device, minimized errors between the evidence based ranked hypothesis for the training inquiry with the actual answer from the key, and the use of the adjusted threshold of the recall oriented introspection algorithm;

program instructions to provision and allocate cloud computing resources for the cognitive distributed computer network based on the received inquiry, the reply to the inquiry, and the predictive cloud using unstructured information management architecture by applying predictive analytics and forecasting; and program instructions to update the unstructured information management architecture in response to new features being added to unstructured information management architecture pipelines, wherein the program instructions are stored on the computer readable storage medium for execution by the CPU via the computer readable memory.

\* \* \* \* \*